United States Patent Office 3,397,149
Patented Aug. 13, 1968

3,397,149
ANTI-SCALE COMPOSITION
Alvin V. Gruber, Rutherford, N.J., assignor, by mesne assignments, to Herman Kahn, New York, N.Y.
No Drawing. Filed Dec. 3, 1965, Ser. No. 511,317
10 Claims. (Cl. 252—181)

ABSTRACT OF THE DISCLOSURE

A method and compositions of matter useful for preventing scale formation during the recovery of fresh water by distillation of sea water or other water at temperatures above about 170° F. are described. The method consists of adding to the water to be distilled small but effective amounts as low as 1 part of the composition to 40,000 parts of water. The compositions consist essentially of agave juice, sodium pyrophosphate, ethylene diamine tetraacetic acid and either sodium silicate or sulfamic acid or both. Practically operable and preferred ranges of proportions of the ingredients, concentrations of the composition in the water to be distilled and distillation temperatures are given.

---

This invention relates to compositions useful in the prevention of scale formation in the recovery of fresh water from sea water and the like.

Efforts to develop economical methods for the conversion of sea water to fresh water have been numerous and have extended over a long period of years. Nevertheless, serious problems still remain, as evidenced, among other things, by the recurring critical shortages of potable water in certain areas, including those close to the sea. One of the most serious of the still-existent problems is that of scale formation on the evaporator and heat transfer surfaces at elevated temperatures, i.e. above about 170° F. Although scale formation is not a problem at low temperatures, the costs of recovery are so great as to be uneconomic.

Among the suggestions which have been made to overcome the problem of scale formation in the recovery of fresh water from sea water, etc., by evaporation or distillation are the introduction of certain chemical materials into the sea water prior to evaporation. Those materials include U.S. Navy boiler compound mixture, sulfuric acid, ferric chloride and Hage-vap. However, the upper temperature limit for use of such materials is about 190° F. Moreover, the use of acids presents problems of increased corrosion and decrease of heat transfer rates.

The problem of scale formation has also been dealt with by provision of techniques for removing the scale. These methods include mechanical cleaning, chemical cleaning and scale cracking or thermal shocking. A system requiring frequent use of any of these methods of scale removal, however, has the obvious disadvantage of capacity loss due to downtime and lowering of the heat transfer rate and equipment capacity and capability as the scale builds up on the heat exchange surfaces.

By the present invention, I have succeeded in providing compositions, which, when added to sea water or the like, even in very small amounts, are effective in preventing salt scale formation on tubes and other surfaces of the evaporator and heat exchanger surfaces of apparatus used in converting the sea water or the like to fresh water at elevated temperatures, i.e., as high as 225° F. and above to about 380° F. and even as high as about 600° F.

An unexpected advantage of my novel compositions is that even at such a high temperature as 600° F., the compositions can be used to effect very high concentrations (up to 9 times) of brine discharge to waste, a result greatly desired, as hereinafter spelled out more in detail.

Another unexpected aspect of this invention is that while some of the ingredients used in my novel compositions may already have been employed in sea water purification processes, such prior uses did not yield the advantageous results obtainable with the compositions of this invention, indicating the uniqueness of the combination of ingredients as used in the present compositions.

The compositions of my present invention consist essentially of agave juice, sodium pyrophosphate (e.g., $Na_4P_2O_7$ or $Na_2H_2P_2O_7$), and ethylene diamine tetraacetic acid, the latter two ingredients being preferably in the form of a separately prepared mixture, and either or both "heavy molecule" sodium silicate and sulfamic acid. The most advantageous results are obtained with all of the named ingredients, as the resulting compositions give optimal results, e.g., minimal scale formation, at temperatures over 380° F. without corrosion problems.

Agave juice is a well known article of commerce. Its various forms as described, for example, in U.S. Patents Nos. 2,111,684; 2,281,392 and 3,019,193, may be employed in accordance with this invention.

Although it has been found that agave juice, having a concentration of from about 10° to about 30° Baumé gives satisfactory results, it is preferred to use juice of from about 12° to about 20° Baumé.

By "heavy molecule" sodium silicate is meant sodium silicates wherein the ratio of $SiO_2$ to $Na_2O$ is at least 1. These are marketed, for example, by the Philadelphia Quartz Company, Philadelphia, Pa., under various trademarks, such as Rusticon and Metso. The former refers to a product in which the weight ratio of $SiO_2/Na_2O$ is 3.22, the product consisting of 19.2% of $Na_2O$, 61.8% $SiO_2$ and about 18.5% of water.

The ingredients of the novel compositions of this invention may be present in varying proportions.

Based on the weight of the total composition, and assuming a concentration of 16° Baumé, it has been found that from about 20% to about 90% of agave juice gives satisfactory results, about 40% to about 60% being preferred. Suitable adjustments in the amounts of juice used are to be made, depending on the concentration used.

On the same basis, from about 10% to about 70% of the combined amount of sodium pyrophosphate and ethylene diamine tetraacetic acid gives desirable results, but amounts from about 40% to about 60% are preferred. The respective amounts of the ingredients mentioned in the preceding sentence employed, based on the total amount of these two ingredients are from about 25% to about 95% of the former and about 75% to about 5% of the latter.

Assuming a ratio of $SiO_2/Na_2O$ of 3.22, it has been found that from about 1% to about 30% of the heavy molecule sodium silicate, based on the total composition, yields satisfactory results, from about 3% to about 10% being preferred. The silicate is preferably employed in the form of an aqueous solution, saturated solutions being advantageous. Only the silicate itself is taken into account in considering the amounts referred to herein.

Adjustments for the amount of sodium silicate employed are also to be made, to take into account the ratio of $SiO_2/Na_2O$ in the silicate and, as will be apparent to those skilled in the art. Thus, for example, if a silicate with a weight ratio of $SiO_2/Na_2O$ of 1.00 is used, the amount of silicate would be about 3 times that used when a silicate with a weight ratio of 3.22 is used. If a silicate with a weight ratio of $SiO_2/Na_2O$ of 2.00 is used, the amount of silicate to use is approximately 30% more than the amount to use when a silicate with a weight ratio of 3.22 is used.

When employed, sulfamic acid is used in amounts from about 1% to about 25%, based on the total compositions. However, advantageous results are obtained when amounts from about 3 to about 10%, on the same basis, are employed. As in the case of the sodium silicate, sulfamic acid is preferably employed in the form of an aqueous solution, and the water is not taken into account in determining the amount of acid to be employed.

In preparing the compositions of this invention, the ingredients are mixed until a homogeneous mixture is obtained. It is preferred, however, to form a mixture of the sodium pyrophosphate and ethylene diamine tetraacetic acid separately and add it to the agave juice, under stirring. The sodium silicate, when used, in the form of an aqueous solution, is then added, dropwise and with stirring, to the mixture of agave juice, sodium pyrophosphate and ethylene diamine tetraacetic acid. When sulfamic acid is used, it is added, in aqueous solution, dropwise, to the resulting mixture under stirring.

The compositions of the present invention are dark in color, and vary from viscous liquids to slurries, depending upon the actual formulation used.

As aforementioned, the compositions of this invention are uniquely suitable for use in preventing scale formation in the high temperature conversion of sea water to fresh water even when the former is concentrated up to nine times its original concentration before the resulting brine is discharged to waste. It has been found, as aforesaid, that these desirable results are obtained even when the novel compositions of this invention are used in very minor amounts, e.g. about 1 part of composition to 20,000 parts of water to be treated. Indeed, satisfactory results have been obtained even when the ratio has been much lower, i.e., from 1 part of composition to 40,000 parts of sea water.

In use, the novel compositions of this invention are added to sea water or the like in a pre-determined amount. Any of the well known distillation processes for converting sea water to fresh water can be used. These processes include vapor compression, multiple effect evaporation, and multi-stage flash evaporation, or any combination of these processes. The preferred initial evaporating temperature can be any elevated temperature up to about 600° F., and for multiple state or effect evaporation, the evaporating temperature for each succeeding step or effect is less than that of its next preceding effect. In general, the conversion of salt water is accomplished when after 9 to 12 effects or steps a final temperature of about 125° F., under a vacuum of around 26" Hg is reached.

As aforementioned, our novel compositions can be employed in the conversion of sea water, or similar water, to fresh water, at elevated temperatures. By elevated temperatures is meant temperatures in the vicinity of 180 pounds and upwards, of steam, in the coils which heat the sea water surrounding the outside of the coils to temperatures from 225° F. up as high as 600° F.

Also as aforementioned, an unexpected advantage of the novel compositions of this invention is that their use in salt water conversion processes results in securing extremely high concentrations of brine which are discharged as waste. This means that a very high yield of fresh water can be obtained from a given amount of sea water. In this connection; whereas, as an example, in the flash-type evaporator prior to this invention when the concentration of salts in the brine reached that equal to about 1½ times that of normal sea water, scale would form and the resulting brine had to be discharged, one can reach a concentration 9 times that of sea water without scale formation, using the composition of the present invention. In practical terms, the increased yield of fresh water not only increases the output of fresh water from a given evaporator but, at the same time, greatly reduces the chemical treating costs per unit of fresh water produced. In the foregoing example given as illustrative, the known process produces a yield of approximately 5 percent of fresh water; whereas, the yield is at least four times higher when the novel product of this invention is used as aforesaid.

By the use of the novel compositions of this invention, the costs of converting salt to fresh water have been so reduced that comparatively small plants producing from 50,000 to 100,000 gallons per day of fresh water can produce the water at a cost which is now possible only in huge plants having a capacity from 10,000,000 to 150,000,000 gallons per day.

Also, by the use of the novel compositions of this invention, it is even possible to operate at extremely higher temperatures than surface temperatures of 400° F. However, scale formation does result, e.g. at surface temperatures over 600° F. The scale, however, is easily removed, e.g. with a dilute solution of sulfamic acid.

The invention will be further illustrated by the following example. Unless otherwise stated, all parts and percentages are by weight and all temperatures are in degrees Fahrenheit in the following examples as well as throughout the specifications and claims.

EXAMPLE

Ordinary sea water (40,000 gallons), to which was added agave juice (16° Baumé) in the proportion of 1 part of the latter to 25,000 parts of sea water, was run through a conventional 3,000 gallons per day salt water evaporator. It was found that the daily yield ran from 3,000 gallons of fresh water to 4,000 gallons, with very slight scale formation at temperatures of the brine solution in the vicinity of 260° F. The resulting brine was found to have a salt concentration only 4 times that of normal sea water.

(A) After the scale was removed from the tubes, a composition consisting of equal parts of 16° Baumé agave juice, a mixture of equal parts of sodium pyrophosphate and ethylene diamine tetraacetic acid, and 3% of sodium silicate (Rusticon) was used in the same proportion as before, i.e., 1 part of composition to 25,000 parts of sea water; and the water was put through the evaporator as before.

When the salt concentration of the resulting brine had reached 4 times that of normal sea water at a temperature of 260° F., it was found that there was no scale formation and the fresh water production amounted to 4,500 gallons per day.

When the last experiment was repeated until the salt concentration of the brine had increased to 6 times that of salt water, with temperatures around 360° F., only slight scale formation in the tubes was observed.

(B) After cleaning the tubes again, the last experiment was repeated, using the composition employed in part A of this example except that the sodium silicate was replaced by the same amount of sulfamic acid.

It was found that markedly better results were obtained: no scale formation at temperatures as high as 600° F.; yield of fresh water was 9,000 gallons daily; and the brine had a salt concentration up to 9 times that of normal sea water.

(C) The last experiment was repeated, using the sulfamic acid-containing composition, of part B to which was also added 3% of sodium silicate (Rusticon). The results were the same as in the low experiment. In addition, it was found that corrosion problems were avoided.

While the invention has been described in its presently preferred embodiments, it will nevertheless be understood that it is intended to cover all changes and modifications which do not constitute departure from the scope of the appended claims. Thus, for example, while sea water has been used as the embodiment of the starting material from which fresh water is obtained, it will be understood that any water having similar characteristics such as salt water, water from industrial processes, brackish water, etc., can be used. Also, while potable fresh water can be made by using the composition of this invention, the latter is not restricted thereto.

What is claimed is:

1. A composition of matter suitable for use in processes for recovering fresh water by distillation at temperatures above 170° F. from water which contains substances which cause salt scale formation when distilled at such temperatures, which consists essentially of agave juice, sodium pyrophosphate, ethylene diamine tetraacetic acid and at least one member selected from the group consisting of sodium silicate and sulfamic acid; the content of agave juice being equivalent to about 20–90 percent of 16° Baumé agave juice, the combined content of sodium pyrophosphate and ethylene diamine tetraacetic acid being about 10–70 percent, the proportions of sodium pyrophosphate to ethylene diamine tetraacetic acid being about 25–95 percent of the former to about 75–5 percent of the latter, the amount of sodium silicate if present being about 1–30 percent, and the amount of sulfamic acid if present being about 1–25 percent; said composition being effective to reduce salt scale formation when employed in a concentration of at least about 1 part in 40,000 parts of water treated, all proportions being by weight.

2. A composition according to claim 1, containing sodium silicate.

3. A composition according to claim 1, containing sulfamic acid.

4. A composition according to claim 1, containing both sodium silicate and sulfamic acid.

5. A composition of matter suitable for use in processes for recovering fresh water by distillation at temperatures above 170° F. from water which contains substances which cause salt scale formation when distilled at such temperatures, which consists essentially of agave juice, sodium pyrophosphate, ethylene diamine tetraacetic acid and at least one member selected from the group consisting of sodium silicate and sulfamic acid; the content of agave juice in said composition being equivalent to about 40–60 percent of 16° Baumé agave juice, the combined content of sodium pyrophosphate and ethylene diamine tetraacetic acid being about 40–60 percent, said sodium pyrophosphate and ethylene diamine tetraacetic acid being present in equal proportions, the amount of sodium silicate if present being about 3–10 percent and the amount of sulfamic acid if present being about 3–10 percent, all proportions being by weight.

6. A composition according to claim 5 wherein the content of agave juice is equivalent to about 47 percent of 16° Baumé agave juice, the content of sodium pyrophosphate is about 23½ percent, the content of ethylene diamine tetraacetic acid is about 23½ percent, the content of sodium silicate is about 3 percent and the content of sulfamic acid is about 3 percent.

7. The process of converting water which contains substances which cause scale formation in distillation processes which comprise adding a minor amount of a composition of claim 12 to such water and distilling the resulting mixture at a temperature above about 170° F. at which salt scale formation normally occurs, said minor amount of said composition being effective to reduce scale formation.

8. The process of converting water which contains substances which cause scale formation in distillation processes which comprises, adding a minor amount of a composition to such water and distilling the resulting mixture at a temperature from about 225° F. up to about 600° F., said minor amount of said composition being effective to reduce salt scale formation, and said composition consisting essentially of agave juice equivalent to about 47 percent of 16° Baumé agave juice, about 23½ percent of sodium pyrophosphate, about 23½ percent of ethylene diamine tetraacetic acid, about 3 percent sodium silicate and about 3 percent sulfamic acid, all proportions being by weight.

9. The process of claim 8, wherein the composition is employed in a concentration no greater than one part in 20,000 parts by weight of water treated.

10. The process of claim 9, wherein the water treated is sea water.

References Cited
UNITED STATES PATENTS

| | | | |
|---|---|---|---|
| 2,260,470 | 10/1941 | May | 252—181 |
| 2,281,392 | 4/1942 | Smead | 252—180 |
| 2,777,818 | 1/1957 | Gambill | 252—181 |
| 3,075,924 | 1/1963 | Rubin | 252—82 |
| 3,110,684 | 11/1963 | Miller | 252—181 |
| 3,135,670 | 6/1964 | Ristaino et al. | 252—181 |

LEON D. ROSDOL, *Primary Examiner.*

W. E. SCHULZ, *Assistant Examiner.*